United States Patent
Spice et al.

(10) Patent No.: US 7,153,554 B2
(45) Date of Patent: Dec. 26, 2006

(54) INKJET RECEPTIVE AND LASER PRINTABLE COATING FOR HOLOGRAPHIC AND METALLIC MEDIA

(75) Inventors: Earl C. Spice, Granby, MA (US); Kyle R. Parent, Holyoke, MA (US)

(73) Assignee: Hazen Paper Company, Holyoke, MA (US)

( * ) Notice: Subject to any disclaimer, the term of this patent is extended or adjusted under 35 U.S.C. 154(b) by 0 days.

(21) Appl. No.: 11/048,138

(22) Filed: Feb. 1, 2005

(65) Prior Publication Data

US 2005/0129880 A1    Jun. 16, 2005

Related U.S. Application Data

(62) Division of application No. 10/439,093, filed on May 15, 2003, now abandoned.

(51) Int. Cl.
*B41M 5/00* (2006.01)

(52) U.S. Cl. .................. 428/32.1; 428/32.28; 428/64.4
(58) Field of Classification Search ............... 428/32.1, 428/32.28, 64.4
See application file for complete search history.

(56) References Cited

U.S. PATENT DOCUMENTS

| | | | |
|---|---|---|---|
| 4,481,244 A | 11/1984 | Haruta et al. | |
| 5,725,961 A | 3/1998 | Ozawa et al. | |
| 5,942,335 A | 8/1999 | Chen et al. | |
| 6,432,501 B1 * | 8/2002 | Yang et al. | 428/40.1 |
| 6,458,449 B1 * | 10/2002 | Parent et al. | 428/32.1 |
| 6,489,266 B1 * | 12/2002 | Kurokawa et al. | 503/227 |
| 6,869,647 B1 * | 3/2005 | Page et al. | 428/32.29 |
| 2003/0207052 A1 * | 11/2003 | Niu et al. | 428/32.38 |
| 2004/0209010 A1 * | 10/2004 | Cuch | 428/32.24 |

* cited by examiner

*Primary Examiner*—Rena Dye
*Assistant Examiner*—Lawrence D. Ferguson
(74) *Attorney, Agent, or Firm*—McCormick, Paulding & Huber LLP

(57) ABSTRACT

One embodiment of an optical medium includes a substrate having a paper layer, an image deposited or otherwise disposed at the paper layer, a primer layer deposited or otherwise disposed at the image layer, and a receptive coating deposited or otherwise disposed at the primer layer of the substrate. One embodiment of an inkjet receptive coating or laser printable coating includes a binder (e.g., an acrylic resin) having a polyvinyl alcohol resin and a polyvinyl pyrrolidone resin incorporated therein. One manner of incorporating the resins into the binder is by blending the resins into the binder.

3 Claims, 1 Drawing Sheet

INKJET RECEPTIVE AND LASER PRINTABLE COATING FOR HOLOGRAPHIC AND METALLIC MEDIA

CROSS-REFERENCE TO RELATED APPLICATION

This application is a divisional of U.S. patent application Ser. No. 10/439,093, filed on May 15, 2003, now abandoned entitled "INKJET RECEPTIVE AND LASER PRINTABLE COATING FOR HOLOGRAPHIC AND METALLIC MEDIA", herein incorporated by reference in its entirety.

TECHNICAL FIELD

This disclosure relates generally to optical mediums, and, more specifically, to a single layer receptive coating applied to a metal foil laminate or a holographic film substrate for the acceptance of an ink from an inkjet or laser printing device.

BACKGROUND OF THE INVENTION

Paper has either a matted or a high gloss surface finish depending on the quality of print desired. In either case, adhesion and dry time of an applied ink from an inkjet printing device are functions of the porosity of the paper and the surface coating. In substrates having matte finishes, pigments used are the primary factor in determining ink acceptance, dry time, and dry image properties. In substrates having glossy surfaces, however, the ink acceptance and image properties are generally more dependent on the resins used in the base coating. The coatings can be water- or solvent based. Either chemistry can provide the desirable optical qualities and enhance the appearance of the paper. When printing from a laser printing device, on the other hand, a toner is fused to the media at a temperature of about 350 degrees F. to about 400 degrees F. and at a pressure of about 70 pounds per square inch (psi) to about 140 psi. Thus, the media used for laser printing softens enough at the elevated temperature at which the toner fuses to the media to allow the toner to anchor at the surface coating while not adhering to the rollers or other printer mechanisms and causing the printing device to not operate properly.

Printing on holographic films or metallic foils has often required the application of a transparent base coat in order to maintain the underlying image appearance. The development of optically clear water-based ink receptive coatings for films and foils involves several additional considerations. First, the film or foil substrate is generally not porous or is porous only to an insignificant amount. A lack of sufficient porosity thus may not provide a suitable degree of adhesion of the coating to the film or foil and furthermore may adversely affect the drying rate of the ink. To facilitate the adhesion of the coating, a tie coat is generally applied to the topmost layer of the film or foil to provide a surface to which subsequent coatings can be anchored. For example, in U.S. Pat. No. 6,458,449 to Parent et al. an ink jet printable coating for holographic paper utilizes a primer layer having a surface tension that is preferably in the range of 35 to 80 dynes and a secondary layer. The secondary layer includes a plurality of microscopic pores sized to allow ink jet ink to penetrate during the printing process.

Second, metallic substrates are often primed with protective coatings to prevent oxidation of the metal, which can detract from the adhesion of subsequent coating layers. Protective clear coats can be difficult to wet out and adhere to when over-coated with water-based coating systems. The ink receptive coating is therefore oftentimes required to fulfill a variety of functions including adhesion to the substrate, ink acceptance and drying, high clarity to highlight the substrate, and good application properties. Since no one vehicle provides all of the desired properties of clear coatings on foils, conventional practice typically results in the use of multiple layer coatings to achieve desired results. This approach limits production application to multiple head coating machines or to the transfer of product between machines to apply the required number of coats. Multiple coats further tend to reduce film clarity due to different indices of refraction between layers. Film clarity may also be reduced as a result of irregularities at the interfaces of each layer. The use of multiple coats and coating machines further increases the potential for product quality issues related to the physical handling of the films or foils during multiple applications of the liquid coating.

A need exists for a single layer water-based optically clear receptive coating that will adhere to protective coats when applied to a metal foil laminated paper or a holographic film for the acceptance of an ink from an ink-jet printing device. A need also exists for an optically clear single layer water-based coating usable on holographic and metallic media that will accept both ink jet and laser printing to provide a dual use media.

SUMMARY OF THE INVENTION

Disclosed herein are exemplary embodiments of optically clear mediums having receptive coatings for holographic film, metal foil, and paper substrates. One embodiment of an optical medium defined by a substrate having a paper layer, an image layer (for example a holographic film or a metal foil) deposited or otherwise disposed on the paper layer, and a primer layer deposited or otherwise disposed on the image layer includes a receptive coating deposited or otherwise disposed on the primer layer of the substrate. One embodiment of an inkjet receptive/laser printable coating includes a binder (e.g., an acrylic resin) having a polyvinyl alcohol resin and a polyvinyl pyrrolidone resin incorporated therein. One manner of incorporating the resins into the binder is by blending the resins into the binder.

The exemplary optical mediums and receptive coatings disclosed herein provide several advantages to manufacturers of inkjet- and laser printing products. First, the acrylic binder with its attendant resins provides desirable adhesion qualities of the ink jet or laser printable receptive coating to the substrate. In particular, the proportions of the resins allow for the application of the inkjet receptive coating in a single coating instead of multiple coatings. Single coating applications result in less product waste due to quality issues. Multiple coating applications, in contrast, typically increase the chances for coating contamination or substrate damage.

Second, the use of a single layer approach provides for optimum flow and leveling of the applied coatings. Inconsistencies in the exposed surface, which often result from inconsistencies in the underlying layers, are minimized or avoided. Furthermore, the times required for the drying of the applied coatings are minimized.

Third, the exemplary inkjet receptive/laser printable coatings provide for improved optical characteristics. In particular, undesirable light scattering is minimized and film clarity is enhanced. Film clarity optimizes the effects of the metal foils or holographic films deposited on film or paper substrates. Such enhanced film clarity is achieved as a result of the elimination of differentials of the indices of refraction between layers as well as the elimination of the interlayer compatibility issues.

BRIEF DESCRIPTION OF THE DRAWINGS

Referring now to the drawings wherein like elements are numbered alike in the several figures.

DETAILED DESCRIPTION OF THE PREFERRED EMBODIMENTS

Figure 1:
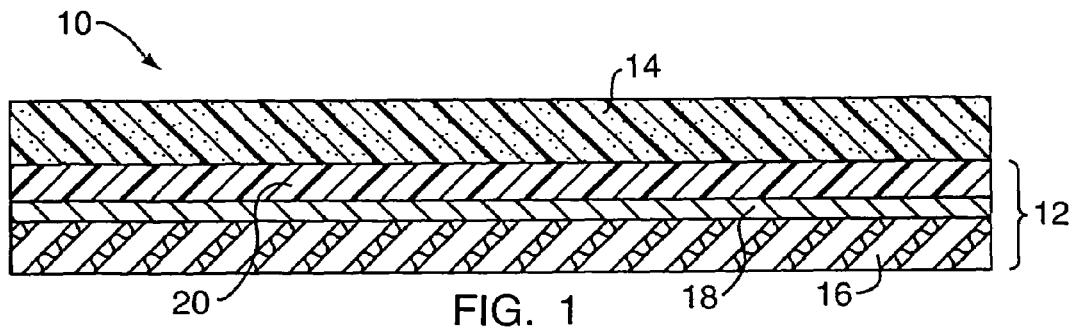
FIG. 1 is a side view of an embodiment of a single layer receptive coating.

Referring now to FIG. 1, one exemplary embodiment of an optical medium is shown at 10. The optical medium 10 comprises a substrate 12 having a coating 14 deposited or otherwise disposed thereon. Although the coating is hereinafter referred to as being an inkjet receptive coating (i.e., capable of receiving a printing from an inkjet printing device), it should be understood by those of skill in the art that the coating is also receptive to printings from laser printing devices or from hot stamp devices. Furthermore, the coating may receive printings from any combination of inkjet, laser, and hot stamp devices.

The substrate 12 comprises a paper layer 16 and an image layer 18. Preferably, the image layer 18 comprises a holographic film or a metal foil into which an image is embossed or otherwise captured. The substrate 12 further comprises a primer layer 20 that provides protective and aesthetic qualities such as color to the substrate 12. In embodiments where the image layer 18 is a metal foil, the primer layer 20 further prevents or minimizes the undesirable oxidation of the metal, which would detract from the appearance of the finished product. The primer layer 20 may be a polymer, e.g., an acrylic, a polyester, a urethane, a vinyl, nitrocellulose, or the like, or any combination of the foregoing polymers.

Figure 2:
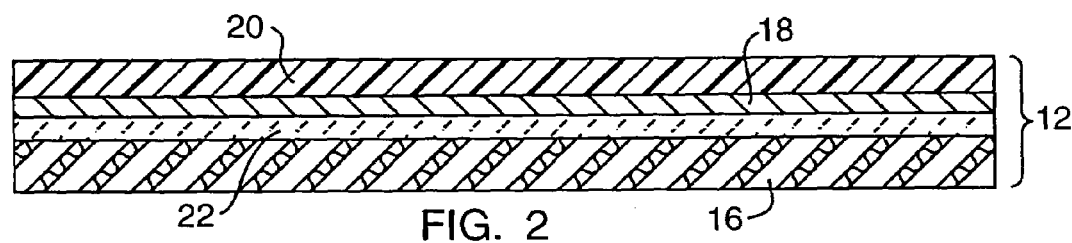
FIG. 2 is a side view of an alternate embodiment of a single layer receptive coating.

A surface preparation layer 22 may optionally be applied between the paper layer 16 and the image layer 18, as is shown with reference to the substrate 12 shown in FIG. 2. The surface preparation layer 22 provides a smooth finish for the application of adhesive paste to which the image layer 18 is then laminated. Materials from which the optional surface preparation layer 22 may be fabricated include, but are not limited to, clays, starches, combinations of the foregoing materials, and the like. As stated above, the primer layer 20 provides additional protection against undesirable oxidation of the metal and may further enhance the decorative properties of the substrate 12.

Referring back to FIG. 1, the inkjet receptive coating 14 is deposited or otherwise disposed directly at the primer layer 20 as a single layer. Preferably, the inkjet receptive coating 14 is non-pigmented and comprises a binder (preferably an acrylic resin) and at least one modifying agent incorporated therein (e.g., blended) such that, when deposited at the primer layer 20, the inkjet receptive coating 14 comprises a homogenous and substantially uniformly thick coating. The term "substantially uniformly thick" is intended to mean that variations in the thickness of the coating are of no significant consequence and do not affect the application of an ink thereto. The inkjet receptive coating is, furthermore, optically clear. As used herein, the term "optically clear" is intended to indicate a quantification of the amount of light transmitted through the coating wherein the amount of light transmitted is equal to or greater than a predetermined value. Preferably, the optical clarity is determined using a gloss meter, which measures the amount of light specularly reflected from the surface of the coating at least one angle. The hydrophobic and non-hygroscopic nature of the binder imparts suitable adhesion characteristics to the inkjet receptive coating 14. Although the binder is preferably an acrylic resin, it should be understood that other materials may be utilized as the binder. Other materials from which the binder may be fabricated include, but are not limited to, polyester resins, urethane resins, vinyl resins, combinations of the foregoing materials, and the like.

Ink acceptance properties of the coating are further enhanced by blending hydrophilic and hygroscopic resins with the acrylic binder. The hydrophilic and hygroscopic nature of the resins provides for the attraction and absorption of the water component of an applied inkjet ink. The absorption of the water facilitates the drying of the applied ink. Preferably, the resins used for modification are polyvinyl alcohol (PVOH) and polyvinyl pyrrolidone (PVP). Other hydrophilic resins and/or water soluble resins such as urethanes, cellulosics, vinyl, gelatins, and the like may also be used as modifiers.

In order to attain the desired level of adhesion of an applied inkjet ink to the inkjet receptive coating 14, to enhance the acceptance of the applied ink, and to minimize the drying time of the applied ink, the amounts of each resin are controlled to effect their proper proportions in the inkjet receptive coating 14. In one embodiment, the active component that results in the inkjet receptive coating 14 is about 7 to about 20 weight percent (wt. %) PVOH and about 40 to about 68 wt. % PVP, with the balance being the acrylic binder. Preferably, the active component for the inkjet receptive coating 14 is about 9 to about 17 wt. % PVOH and about 48 to about 60 wt. % PVP, with the balance being the acrylic binder. More preferably, active component for the inkjet receptive coating 14 is about 11 to about 15 wt. % PVOH and about 51 to about 57 wt. % PVP, with the balance being the acrylic binder.

The acrylic binder and the modifying resins are dispersed in an inactive volatile component, e.g., water or a water-based carrier for application to the substrate 12. Preferably, the water-based carrier includes an alcohol (e.g., methanol, ethanol, isopropanol, mixtures of the foregoing alcohols, and/or other water miscible solvents such as glycol ethers, ketones, and the like.) More preferably, the water-based carrier comprises isopropanol in an amount up to about 25%. The use of isopropanol in the carrier provides for improved substrate wetting, improved dry film adhesion, and faster drying time of the inkjet receptive coating 14. The use of the alcohol, furthermore, may eliminate the need for the use of defoamers or other additives that detract from the dry film clarity upon application of the coating.

Figure 3:
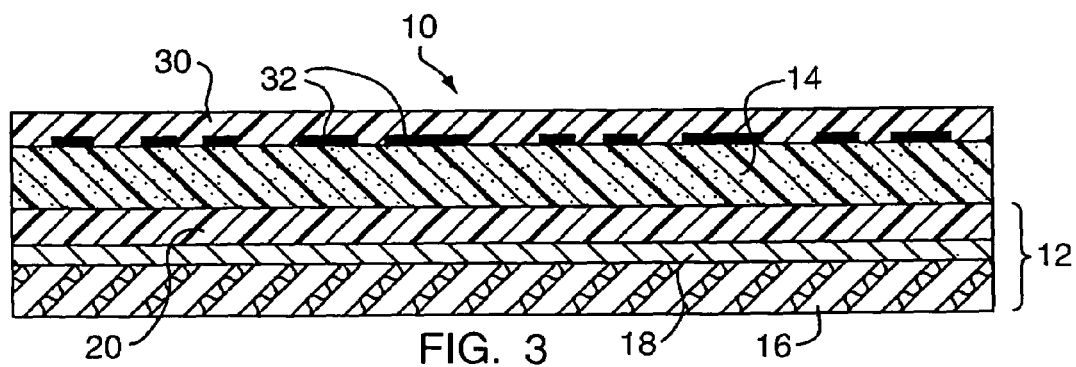
FIG. 3 is a side view of a receptive coating at which a laminate topcoat is applied.

Referring now to FIG. 3, another exemplary embodiment of the optical medium 10 is shown. As above, the optical medium 10 comprises the substrate 12 and the inkjet receptive coating 14. The optical medium 10 further comprises a topcoat 30 (e.g., a laminate, a pressure-sensitive adhesive, an aerosol, or the like) applied over printing 32 printed on the inkjet receptive coating 14. As stated above, the printing 32 may be printed from an inkjet printing device, a laser printing device, a hot stamp device, or from any combination of the foregoing devices. In any embodiment the topcoat 30 can be applied over the inkjet receptive coating 14 and the printing 32 and heat-sealed without detracting from the optical qualities of the optical medium 10 or compromising the quality of the printing 32.

The inkjet receptive coating 14 in any of the above-described embodiments, as well as the other layers deposited on the substrate 12, may be applied by any one or a combination of a wide variety of methods. In particular, the inkjet receptive coating 14 and its attendant layers may be applied using meyer rod, slot die, multi-roll, reverse roll, between-the-roll, or air knife methods.

One exemplary embodiment of the invention is illustrated by way of the following Example.

EXAMPLE

A first sample (an optical medium) having a substrate and the inventive receptive coating was prepared and evaluated to determine various properties. The substrate included a paper layer defined by 60 pound lithographic sheeting having a clay coating on one side, a metal foil image layer, and a primer layer comprising a styrenated acrylic. The receptive coating comprising 12.9 wt. % PVOH and 54.3 wt. % PVP with the balance being styrenated acrylic binder was disposed directly on the acrylic primer layer of the substrate.

A second sample (another optical medium) having a substrate and a receptive coating of the prior art was also prepared, evaluated, and compared to the first sample. In the second sample, a coating of 100 wt. % PVOH was disposed on a substrate including a paper layer defined by 60 pound lithographic sheeting having a clay coating on one side, a metal foil image layer, and a styrenated acrylic primer layer. The PVOH coating was configured as a relatively thick base coat on which was disposed an upper layer in which microscopic pores of about 1 to about 6 microns in diameter were formed using a rotogravure coating process.

Attributes of both samples were measured and compared. As can be seen from the Table presented below, the first sample comprising the inventive receptive coating resulted in a product having an increased number of desirable properties than the second sample.

| Attribute | Sample 1 | Sample 2 |
| --- | --- | --- |
| Gloss (gloss units) | 335 | 220 |
| CD range | 3% | 10% |
| Background | Bright and clear | Moderate stipple |
| Visual uniformity | Excellent | Low level defects detected |
| Image quality | Excellent | Good |
| Drying time (seconds) | 15–30 | 30–60 |

In evaluating the samples, the gloss of the sample having the inventive receptive coating was increased about 52%. Gloss, as measured in gloss units, is a quantification of the luster or shine of a surface off which light is specularly reflected. The resultant gloss unit values presented above are averages of gloss values measured at three different angles at which the light is reflected from the surfaces. The gloss of each sample was measured using a Mirror TRI-Gloss Meter, available from BYK Gardner located in Columbia, Md.

The estimated cross-directional range (CD range) was desirably reduced from about 10% for the sample having the prior art receptive coating to about 3% for the sample having the inventive receptive coating. The CD range is a measure of the variation of the amount of coating coverage in the direction across the web and is quantified using industry-standard test procedures specific to each paper manufacturer.

The background, visual uniformity, and image quality were all likewise enhanced for the sample having the inventive receptive coating. The background quality was improved from a moderate stipple appearance to a bright and clear appearance. The visual uniformity was also improved due to the reduction or elimination of low level point defects and non-uniformities as a result of the use of an improved coating rheology in the surface finish. The image quality (acuity) of the finish was also improved. In particular, no bleed of ink from the inked areas and no coalescence of ink at the surface of the printing on the inventive receptive coating were observable. The background and visual uniformity for each sample was measured visually, and the image quality was measured using an inkjet media test print pattern.

The drying time of a printing was also improved on the sample having the inventive receptive coating. The drying time was determined by a smear test in which a test operator smeared ink printings for each sample with their finger at 5 second intervals. As shown, the sample having the inventive receptive coating disposed thereon experienced a "2×" reduction, i.e., the drying time was cut in half.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the appended claims.

What is claimed is:

1. An optical medium having a substrate defined by a paper layer, an image layer disposed on said paper layer, and a primer layer disposed on said image layer, said optical medium comprising:

a single layer receptive coating disposed on said primer layer of said substrate;

wherein said single layer receptive coating is substantially uniform in thickness and is optically clear; and wherein said single layer receptive coating comprises, an acrylic resin binder, a first modifying agent incorporated into said binder, wherein said first modifying agent is polyvinyl alcohol, a second modifying agent incorporated into said binder, wherein said second modifying agent is polyvinyl pyrrolidone, wherein said binder and said first and second modifying agents are dispersed in an inactive volatile component, and wherein said single layer receptive coating comprises about 7 to about 20 weight percent polyvinyl alcohol and about 40 to about 68 weight percent polyvinyl pyrrolidone.

2. The optical medium of claim 1, wherein said single layer receptive coating is configured to receive an inkjet printing, a laser printing, a printing from a hot stamp device, or a combination of the foregoing printings.

3. The optical medium of claim 1, further comprising a topcoat applied over said single layer receptive coating after said single layer receptive coating has been printed.

* * * * *